United States Patent
Okutani

(10) Patent No.: US 10,256,508 B2
(45) Date of Patent: Apr. 9, 2019

(54) NON-AQUEOUS ELECTROLYTE SECONDARY BATTERY

(71) Applicant: Sanyo Electric Co., Ltd., Daito-shi, Osaka (JP)

(72) Inventor: Eiji Okutani, Hyogo (JP)

(73) Assignee: SANYO ELECTRIC CO., LTD., Daito-shi (JP)

(*) Notice: Subject to any disclaimer, the term of this patent is extended or adjusted under 35 U.S.C. 154(b) by 490 days.

(21) Appl. No.: 14/900,536

(22) PCT Filed: Jun. 10, 2014

(86) PCT No.: PCT/JP2014/003086
§ 371 (c)(1),
(2) Date: Dec. 21, 2015

(87) PCT Pub. No.: WO2015/001719
PCT Pub. Date: Jan. 8, 2015

(65) Prior Publication Data
US 2016/0172712 A1 Jun. 16, 2016

(30) Foreign Application Priority Data
Jul. 1, 2013 (JP) .................................. 2013-137933

(51) Int. Cl.
*H01M 10/0587* (2010.01)
*H01M 2/34* (2006.01)
(Continued)

(52) U.S. Cl.
CPC ......... *H01M 10/0587* (2013.01); *H01M 2/14* (2013.01); *H01M 2/34* (2013.01);
(Continued)

(58) Field of Classification Search
None
See application file for complete search history.

(56) References Cited

U.S. PATENT DOCUMENTS

| 5,427,875 A | 6/1995 | Yamamoto et al. |
| 8,110,309 B2 | 2/2012 | Taniguchi et al. |
| (Continued) | | |

FOREIGN PATENT DOCUMENTS

| CN | 102007623 A | 4/2011 |
| CN | 102468488 A | 5/2012 |
| (Continued) | | |

OTHER PUBLICATIONS

English Translation of Chinese Search Report dated Feb. 27, 2017, issued in counterpart Chinese Patent Application No. 201480036028.9. (1 page).

(Continued)

*Primary Examiner* — Rena Dye Cronin
(74) *Attorney, Agent, or Firm* — Westerman, Hattori, Daniels & Adrian, LLP

(57) ABSTRACT

The invention aims to allow carbon dioxide, which is generated upon decomposition of lithium carbonate contained in a positive electrode mixture layer, to easily flow toward the outside of a flat wound electrode body, and further aims to rapidly raise the pressure inside a battery and to reliably operate a pressure-sensitive current interrupt mechanism before the temperature inside the battery rises to such an extent as causing an abnormal state, e.g., smoking, firing, or a burst.

A nonaqueous electrolyte secondary battery (10) according to one embodiment of the present invention includes a pressure-sensitive current interrupt mechanism. An insulating tape (11*b*) is bonded onto a positive electrode mixture layer (11*a*) in at least one of a winding start-side edge portion and a winding end-side edge portion of a positive electrode plate (11) in a flat wound electrode body (14) at a (Continued)

position opposing to a separator (13), the insulating tape extending in a widthwise direction of the positive electrode mixture layer (11a).

20 Claims, 5 Drawing Sheets

(51) Int. Cl.
*H01M 4/62* (2006.01)
*H01M 2/14* (2006.01)
*H01M 4/139* (2010.01)

(52) U.S. Cl.
CPC ........... *H01M 2/345* (2013.01); *H01M 4/139* (2013.01); *H01M 4/62* (2013.01); *H01M 2200/20* (2013.01); *H01M 2220/20* (2013.01)

(56) References Cited

U.S. PATENT DOCUMENTS

| | | | |
|---|---|---|---|
| 2004/0121239 A1 | 6/2004 | Abe et al. | |
| 2007/0048613 A1* | 3/2007 | Yanagida | H01M 4/66 429/245 |
| 2008/0050658 A1 | 2/2008 | Abe et al. | |
| 2008/0182175 A1 | 7/2008 | Okazaki et al. | |
| 2008/0280197 A1 | 11/2008 | Machida | |
| 2010/0099031 A1* | 4/2010 | Kato | H01M 10/052 429/330 |
| 2010/0209765 A1 | 8/2010 | Bak | |
| 2011/0039160 A1* | 2/2011 | Takahata | H01M 2/34 429/231.1 |
| 2011/0052976 A1 | 3/2011 | Ishii et al. | |
| 2011/0159344 A1 | 6/2011 | Kobayashi et al. | |
| 2012/0107652 A1 | 5/2012 | Iyori et al. | |
| 2012/0214061 A1 | 8/2012 | Machida | |
| 2013/0052500 A1* | 2/2013 | Nonaka | H01M 2/0237 429/94 |
| 2014/0030562 A1 | 1/2014 | Ishii et al. | |
| 2014/0162117 A1 | 6/2014 | Matsuno et al. | |
| 2014/0342205 A1 | 11/2014 | Machida | |
| 2015/0214513 A1 | 7/2015 | Ishii et al. | |

FOREIGN PATENT DOCUMENTS

| | | |
|---|---|---|
| JP | 4-328278 A | 11/1992 |
| JP | 2003-331822 A | 11/2003 |
| JP | 2008-186792 A | 8/2008 |
| JP | 2008-277207 A | 11/2008 |
| JP | 2010-192438 A | 9/2010 |
| JP | 2011-49066 A | 3/2011 |
| JP | 2011-138632 A | 7/2011 |
| JP | 2011-216403 A | 10/2011 |
| JP | 2013-45759 A | 3/2013 |
| JP | 2013-73794 A | 4/2013 |
| WO | 02/059999 A1 | 8/2002 |

OTHER PUBLICATIONS

International Search Report dated Sep. 9, 2014, issued in counterpart Application No. PCT/JP2014/003086 (2 pages).

* cited by examiner

NON-AQUEOUS ELECTROLYTE SECONDARY BATTERY

TECHNICAL FIELD

The present invention relates to a nonaqueous electrolyte secondary battery equipped in a vehicle.

BACKGROUND ART

A vehicle-equipped nonaqueous electrolyte secondary battery used in, e.g., a power supply for driving an electric vehicle (EV) or a hybrid electric vehicle (HEV or PHEV) includes a pressure-sensitive current interrupt mechanism in addition to a safety valve for the prevention of explosion. The pressure-sensitive current interrupt mechanism is operated with gas that is quickly generated inside the battery in an abnormal state. The current interrupt mechanism is provided to interrupt a current that is going to flow toward the outside, and to prevent a burst of the battery or firing.

In the nonaqueous electrolyte secondary battery, raising a charging voltage is known as one of methods for increasing the battery capacity. As a safety measure in consideration of the event of an overcharge state of the nonaqueous electrolyte secondary battery, it is also known to add, into a nonaqueous electrolytic solution, one or more overcharge inhibitors such as tert-amylbenzene and/or biphenyl (see Patent Literature (PTL) 1), or a cycloalkyl benzene compound and/or a compound having quarternary carbon adjacent to a benzene ring (see PTL 2). However, raising the charging voltage to increase the battery capacity accompanies with a risk that the overcharge inhibitor may be decomposed even at a voltage, which is set within the range for ordinary use, depending on the type of the overcharge inhibitor, and that battery characteristics and safety may degrade after charge and discharge cycles.

From the viewpoint of solving the above-mentioned problem, it is further known to improve overcharge tolerance by adding lithium carbonate ($Li_2CO_3$) to a positive electrode mixture of the nonaqueous electrolyte secondary battery (see PTL 3). When lithium carbonate is added to the positive electrode mixture of the nonaqueous electrolyte secondary battery, carbon dioxide is generated from a positive electrode plate upon application of a high voltage to the battery, e.g., in the event of overcharge. As a result, the pressure-sensitive current interrupt mechanism can be caused to operate reliably with the generated carbon dioxide at earlier timing than the operation of the safety valve for the prevention of explosion.

CITATION LIST

Patent Literature

PTL 1: International Publication No. 2002/059999
PTL 2: Japanese Published Unexamined Patent Application No. 2008-186792
PTL 3: Japanese Published Unexamined Patent Application No. 04-328278

SUMMARY OF INVENTION

Technical Problem

The nonaqueous electrolyte secondary battery includes a wound electrode body in which a positive electrode plate and a negative electrode plate are wound in a state insulated from each other with a separator interposed between both the plates. In the wound electrode body having a flat roll shape, edge portions of the positive electrode plate at the winding start side and the winding end side are covered with the separators. Because the separator is soft, the edge portions of the positive electrode plate at the winding start side and the winding end side are closely covered with the separator.

When the nonaqueous electrolyte secondary battery comes into an overcharge state, gas is generated from a surface of the positive electrode plate, and the generated gas moves from the inside of the flat wound electrode body toward the outside. With the positive electrode plate being in the above-mentioned state, however, the generated gas is hard to move to the outside of the wound electrode body through the edge portions of the positive electrode plate at the winding start side and the winding end side, those edge portions forming part of a gas release path, whereby the generated gas remains on the surface of the positive electrode plate within the wound electrode body. Accordingly, the pressure-sensitive current interrupt mechanism cannot be reliably operated. In such a case, in a region where the gas is present on the surface of the positive electrode plate, no current flows and the overcharge state disappears. At the same time, however, in a region, which is located around the above-mentioned region and in which the gas is not present on the surface of the positive electrode plate, an excessive current is caused to flow, and the overcharge state is further progressed.

Solution to Problem

A nonaqueous electrolyte secondary battery according to one aspect of the present invention includes:

a positive electrode plate including a positive electrode mixture layer formed on a positive electrode core;

a negative electrode plate including a negative electrode mixture layer formed on a negative electrode core;

a flat wound electrode body in which the positive electrode plate and the negative electrode plate are wound into a flat roll shape in a state insulated from each other with a separator interposed between the positive electrode plate and the negative electrode plate;

a nonaqueous electrolyte; and an outer casing, wherein a positive electrode core exposed portion is formed in a form of wound multilayers in one end portion of the flat wound electrode body, a negative electrode core expensed portion is formed in a form of wound multilayers in the other end portion of the flat wound electrode body, the wound multilayers of the positive electrode core exposed portion are bundled and connected to a positive electrode current collector, the wound multilayers of the negative electrode core exposed portion are bundled and connected to a negative electrode current collector, the nonaqueous electrolyte secondary battery includes a pressure-sensitive current interrupt mechanism electrically connected to at least one of the positive electrode current collector and the negative electrode current collector, the positive electrode mixture layer contains lithium carbonate, and an insulating tape is bonded onto the positive electrode mixture layer in at least one of a winding start-side edge portion and a winding end-side edge portion of the positive electrode plate at a position opposing to the separator, the insulating tape extending in a widthwise direction of the positive electrode mixture layer.

Advantageous Effects of Invention

In the nonaqueous electrolyte secondary battery according to one aspect of the present invention, the positive electrode mixture layer contains lithium carbonate, and an insulating tape is bonded onto the positive electrode mixture layer in at least one of a winding start-side edge portion and a winding end-side edge portion of the positive electrode plate at a position opposing to the separator, the insulating tape extending in a widthwise direction of the positive electrode mixture layer. With the provision of the insulating tape, a step-like level difference is formed between the positive electrode mixture layer and the separator, and with the presence of the step-like level difference, a gas permeable path is formed in a direction of a winding axis of the flat wound electrode body. Accordingly, carbon dioxide generated upon decomposition of lithium carbide contained in the positive electrode mixture layer in the event of an overcharge state is allowed to easily flow toward the outside of the flat wound electrode body through the gas permeable path formed with the presence of the step-like level difference.

With the nonaqueous electrolyte secondary battery according to one aspect of the present invention, therefore, the carbon dioxide is less likely to stagnate on the surface of the positive electrode mixture layer. As a result, before the temperature inside the battery rises to such an extent as causing an abnormal state, e.g., smoking, firing, or a burst, it is possible to rapidly raise the pressure inside a battery, and to reliably operate the pressure-sensitive current interrupt mechanism. Hence very high stability is ensured in the event of overcharge.

DESCRIPTION OF EMBODIMENT

Figure 1A:
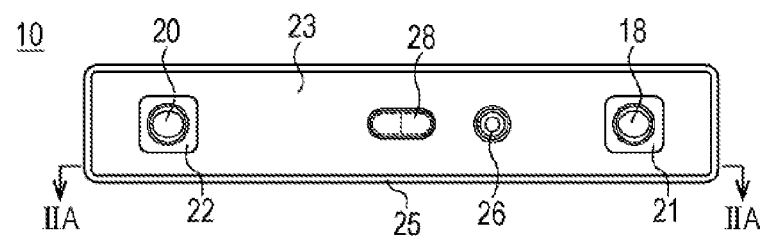
FIG. 1A is a plan view of a nonaqueous electrolyte secondary battery according to an embodiment.

An embodiment of the present invention will be described in detail below with ref erence to the drawings. It is to be noted that the following embodiment is disclosed merely illustrative for understanding of the technical concept of the present invention and is not intended to restrict the scope of the present invention. The present invention can be similarly applied to a variety of cases that are modified without departing from the technical concept defined in claims.

Embodiment

To begin with, a nonaqueous electrolyte secondary battery according to an embodiment is described below with reference to FIGS. 1 to 4. As illustrated in FIG. 4, the nonaqueous electrolyte secondary battery 10 includes a flat wound electrode body 14 in which a positive electrode plate 11 and a negative electrode plate 12 are wound in a state insulated from each other with a separator 13 interposed between both the plates. An outermost surface of the flat wound electrode body 14 is covered with the separator 13, while the negative electrode plate 12 is positioned on the side closer to an outer periphery than the positive electrode plate 11.

Figure 3A:
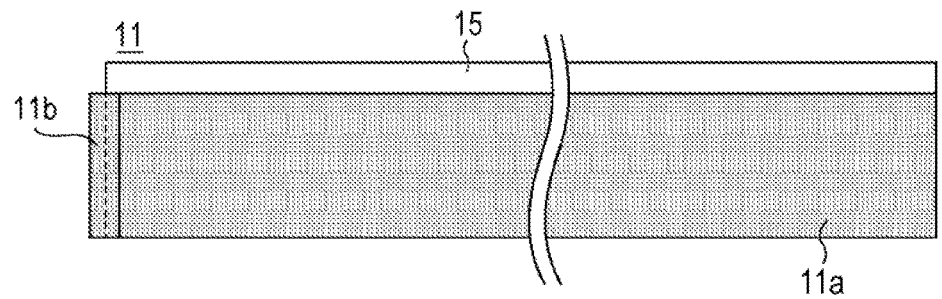
FIG. 3A is a plan view of a positive electrode plate used in the nonaqueous electrolyte secondary battery according to the embodiment.

As illustrated in FIG. 3A, the positive electrode plate 11 includes a positive electrode mixture layer 11a formed on each of both surfaces of a positive electrode core, which is made of an aluminum or aluminum alloy foil having a thickness of about 10 to 20 μm, in such a state that the positive electrode core is exposed in a band-like shape along one end of the positive electrode core in a widthwise direction thereof. A portion of the positive electrode core where the core is exposed in the band-like shape is a positive electrode core exposed portion 15. An insulating tape 11b is bonded to a winding end-side edge portion of the positive electrode plate 11 at each of positions, which are located on both the surfaces of the positive electrode mixture layers 11a and which are each opposed to the separator 13, the insulating tape 11b extending in a widthwise direction of the positive electrode mixture layer 11a. The detailed constitution, operation, etc. of the insulating tape 11b will be described later.

Figure 3B:
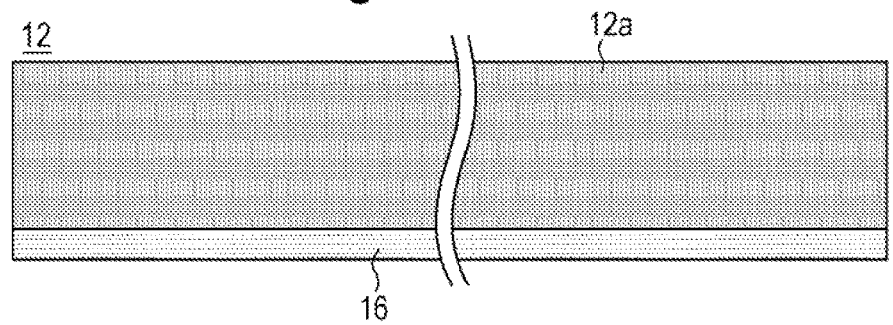
FIG. 3B is a plan view of a negative electrode plate used therein.

As illustrated in FIG. 3B, the negative electrode plate 12 includes a negative electrode mixture layer 12a formed on each of both surfaces of a negative electrode core, which is made of a copper or copper alloy foil having a thickness of about 5 to 15 μm, in such a state that the negative electrode core is exposed in a band-like shape along one end of the negative electrode core in a widthwise direction thereof. A portion of the negative electrode core where the core is exposed in the band-like shape is a negative electrode core exposed portion 16. The positive electrode core exposed portion 15 and the negative electrode core exposed portion 16 may be formed along both ends of the positive electrode plate 11 and the negative electrode plate 12 in the widthwise direction thereof, respectively.

Figure 4A:
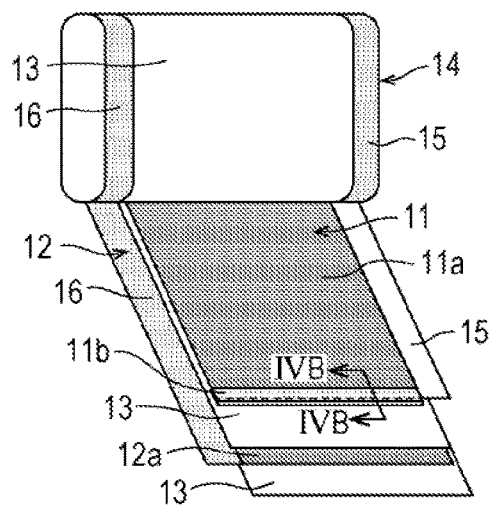
FIG. 4A is a perspective view of a flat wound electrode body in the embodiment in a state where the winding end side thereof is developed.
Figure 4B:
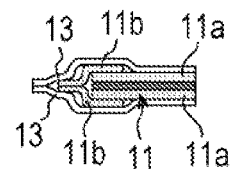
FIG. 4B is an enlarged sectional view taken along a line IVB-IVB in FIG. 4A after the completion of winding of the flat wound electrode body.

The flat wound electrode body 14 is fabricated by winding the positive electrode plate 11 and the negative electrode plate 12 into a flat roll shape in a state insulated from each other with the separator 13 interposed between both the plates, while positioning the positive electrode core exposed portion 15 and the negative electrode core exposed portion 16 to be deviated such that each core exposed portion does not overlap the mixture layer of the opposing electrode plate. As illustrated in FIGS. 2A, 2B and 4A, the flat wound electrode body 14 includes the positive electrode core exposed portion 15 in the form of laminated multilayers at one end thereof, and the negative electrode core exposed portion 16 in the form of laminated multilayers at the other end thereof. As the separator 13, a micro-porous film made of, preferably, polyolefin is used in such a manner that two sheets are arranged one above the other, or that one sheet having a long size is folded. The separator 13 used here has a width being enough to cover the positive electrode mixture layer 11a and being larger than that of the negative electrode mixture layer.

The positive electrode core exposed portion 15 in the form of laminated multilayers is electrically connected to a positive electrode terminal 18 through a positive electrode current collector 17. A current interrupt mechanism 27 operating in response to the pressure of gas generated inside the battery is disposed between the positive electrode current collector 17 and the positive electrode terminal 18. The negative electrode core exposed portion 16 in the form of laminated multilayers is electrically connected to a negative electrode terminal 20 through a negative electrode current collector 19.

Figure 1B:
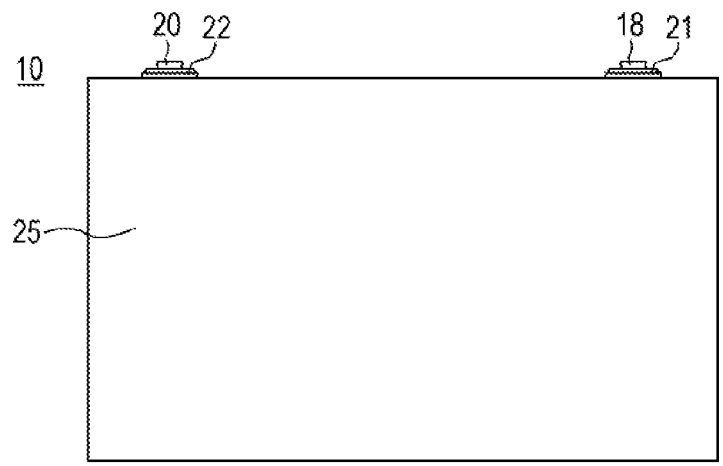
FIG. 1B is a front view of the nonaqueous electrolyte secondary battery.

As illustrated in FIGS. 1A, 1B and 2A, the positive electrode terminal 18 and the negative electrode terminal 20 are fixed to an sealing member 23 with insulating members 21 and 22 interposed therebetween, respectively. A gas discharge valve 28 is also disposed in the sealing member 23, the gas discharge valve 28 being opened in response to application of gas pressure higher than the operating pressure of the current interrupt mechanism 27. The positive electrode current collector 17, the positive electrode terminal 18, and the sealing member 23 are each made of aluminum or an aluminum alloy. The negative electrode current collector 19 and the negative electrode terminal 20 are each made of copper or a copper alloy.

The flat wound electrode body 14 is inserted within a rectangular outer casing 25 that is opened at one side, while an insulating sheet 24 made of a resin material is disposed between the flat wound electrode body and an inner periphery of the rectangular outer casing 25 except for the one side where the sealing member 23 is disposed. The rectangular outer casing 25 is made of, e.g., aluminum or an aluminum alloy. The sealing member 23 is fitted to an opening of the rectangular outer casing 25, and the sealing member 23 and the rectangular outer casing 25 fitted to each other are laser-welded at the interface between them. A nonaqueous electrolytic solution is filled into the rectangular outer casing 25 through an electrolytic solution filling port 26, and the electrolytic solution filling port 26 is closed by a blind rivet, for example.

In a variety of applications, the nonaqueous electrolyte secondary battery 10 is employed alone or plural in a state connected in series, parallel, or serial parallel. When the nonaqueous electrolyte secondary battery 10 is employed plural in a state connected in series or parallel in a vehicle, for example, the individual batteries are preferably connected to each other through bus bars by additionally disposing positive electrode external terminals and negative electrode external terminals.

The flat wound electrode body 14 used in the nonaqueous electrolyte secondary battery 10 according to the embodiment is adapted for applications that require a high battery capacity of 20 Ah or more and a high output characteristic. For example, the number of windings of the positive electrode plate 11 is 43, namely the total number of laminated layers of the positive electrode plate 11 is as large as 86. It is to be noted that when the number of windings of the positive electrode plate 11 is 15 or more, namely when the total number of laminated layers thereof is 30 or more, the battery capacity of 20 Ah or more can be easily obtained without increasing the battery size excessively.

When the total number of laminated layers in each of the positive electrode core exposed portion 15 and the negative electrode core exposed portion 16 is large as mentioned above, a large amount of welding current is needed to form welding marks 15a and 16a that penetrate respectively through all the laminated layers of the positive electrode core exposed portion 15 and the negative electrode core exposed portion 16 each in the form of laminated multilayers, when the positive electrode current collector 17 and the negative electrode current collector 19 are joined respectively to the positive electrode core exposed portion 15 and the negative electrode core exposed portion 16 by resistance welding.

Figure 2C:
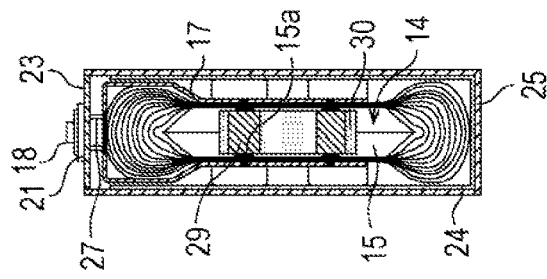
FIG. 2C is a sectional view taken along a line IIC-IIC in FIG. 2A.
Figure 2A:
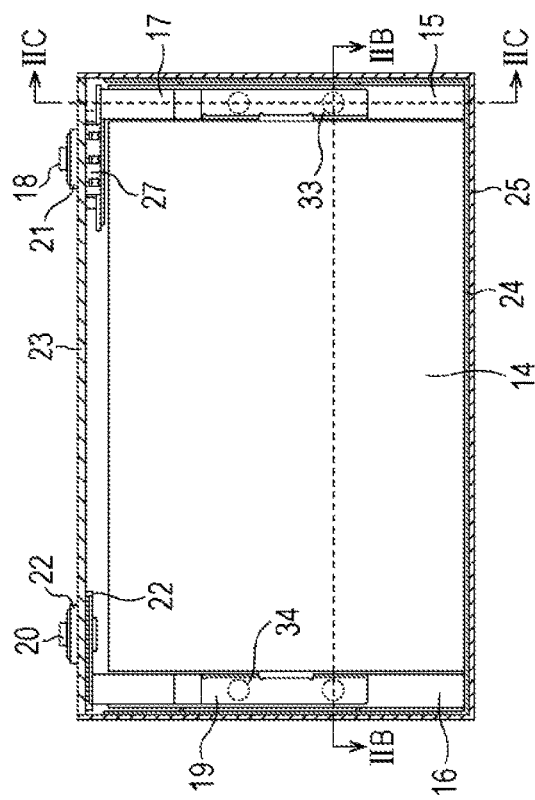
FIG. 2A is a partial sectional view taken along a line IIA-IIA in FIG. 1A.
Figure 2B:
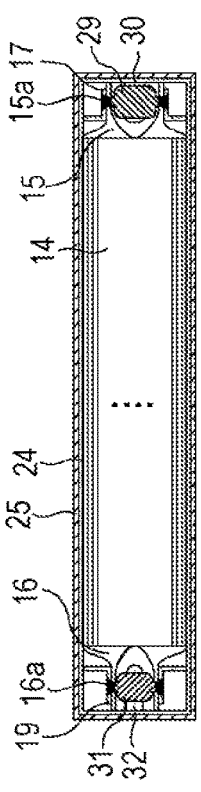
FIG. 2B is a partial sectional view taken along a line IIB-IIB in FIG. 2A.

In view of the above-mentioned point, as illustrated in FIGS. 2A to 2C, on the side where the positive electrode plate 11 is led out, the wound and laminated multilayers of the positive electrode core exposed portion 15 are bundled toward a center in a thickness direction of the flat wound electrode body, and are divided into two groups. The two groups of the wound and laminated multilayers of the positive electrode core exposed portion 15 are each further bundled toward a position, as a center, distanced through ¼ of the thickness of the flat wound electrode body from one of both the surfaces thereof. A positive electrode intermediate member 30 is arranged between the two groups of the wound and laminated multilayers of the positive electrode core exposed portion 15. The positive electrode intermediate member 30 includes a base made of a resin material, and the base holds a plurality of, e.g., two, positive electrode conductive members 29 having electrical conductivity. Each of the positive electrode conductive members 29 is in the form of a circular column, for example, and it includes a conical prominence that acts as a projection and that is formed on the side facing the laminated multilayers of the positive electrode core exposed portion 15.

On the side where the negative electrode plate 12 is led out, the wound and laminated multilayers of the negative electrode core exposed portion 16 are bundled toward a center in a thickness direction of the flat wound electrode body, and are divided into two groups. The two groups of the wound and laminated multilayers of the negative electrode core exposed portion 16 are each further bundled toward a position, as a center, distanced through ¼ of the thickness of the flat wound electrode body from one of both the surfaces thereof. A negative electrode intermediate member 32 is arranged between the two groups of the wound and laminated multilayers of the negative electrode core exposed portion 16. The negative electrode intermediate member 32 includes a base made of a resin material, and the base holds a plurality of, two in the illustrated example, negative electrode conductive members 31. Each of the negative electrode conductive members 31 is in the form of a circular column, for example, and it includes a conical prominence that acts as a projection and that is formed on the side facing the laminated multilayers of the negative electrode core exposed portion 16.

The positive electrode current collector 17 is arranged in contact with each of outermost surfaces of the two laminated multilayer groups of the positive electrode core exposed portion 15, those two laminated multilayer groups being positioned on both the sides of each positive electrode conductive member 29, and the negative electrode current collector 19 is arranged in contact with each of outermost surfaces of the two laminated multilayer groups of the negative electrode core exposed portion 16, those two laminated multilayer groups being positioned on both the sides of each negative electrode conductive member 31. The positive electrode conductive member 29 is preferably made of the same material as that of the positive electrode core, i.e., aluminum or an aluminum alloy. The negative electrode conductive member 31 is preferably made of the same material as that of the negative electrode core, i.e., copper or a copper alloy. Shapes of the positive electrode conductive member 29 and the negative electrode conductive member 31 may be the same or different from each other.

A resistance welding method used for the positive electrode core exposed portion 15, the positive electrode current collector 17, and the positive electrode intermediate member 30 including the positive electrode conductive members 29, which constitute the flat wound electrode body 14 in the embodiment, and a resistance welding method used for the negative electrode core exposed portion 16, the negative electrode current collector 19, and the negative electrode intermediate member 32 including the negative electrode conductive members 31, which also constitute the flat wound electrode body 14, are known in the art, and hence detailed description of those methods is omitted.

By dividing the laminated multilayers of each of the positive electrode core exposed portion 15 and the negative electrode core exposed portion 16 into two groups as mentioned above, a welding current required to form a welding mark penetrating through all the plural laminated multilayers per group in each of the positive electrode core exposed portion 15 and the negative electrode core exposed portion 16 is reduced in comparison with that required in the case where the laminated multilayers are not divided into the two groups. Accordingly, the occurrence of sputtering during the resistance welding is suppressed, and the occurrence of troubles caused by the sputtering, such as inner short-circuiting in the flat wound electrode body 14, is suppressed. FIG. 2A illustrates two welding marks 33 formed in the positive electrode current collector 17 by the resistance welding, and two welding marks 34 formed in the negative electrode current collector 19.

Practical production methods and compositions of the positive electrode plate 11, the negative electrode plate 12, the flat wound electrode body 14, and the nonaqueous electrolytic solution in the nonaqueous electrolyte secondary battery 10 of the embodiment will be described below.

[Fabrication of Positive Electrode Plate]

A lithium nickel cobalt manganese compound oxide expressed by $LiNi_{0.35}Co_{0.35}Mn_{0.30}O_2$ was used as a positive electrode active material. Positive electrode mixture slurry was prepared by weighing the lithium nickel cobalt manganese compound oxide, carbon powder as a conductive agent, polyvinylidene fluoride (PVdF) as a binder, and lithium carbonate at a mass ratio of 92:0.9:5:1.5, and by mixing N-methyl-2-pyrrolidone (NMP) as a dispersion medium to them.

Preferably, lithium carbonate is contained at a content of 0.1 to 5.0% by mass with respect to the positive electrode mixture. If the content of lithium carbonate in the positive electrode mixture is less than 0.1% by mass, an amount of carbon dioxide generated from the lithium carbonate would be reduced and the current interrupt mechanism would be hard to operate promptly. If the content of lithium carbonate in the positive electrode mixture is more than 5.0% by mass, a proportion of the lithium carbonate not taking part in the electrode reaction would be increased excessively, and a reduction of the battery capacity would be increased.

An aluminum foil having a thickness of 15 µm was used as the positive electrode core, and the positive electrode mixture slurry prepared as mentioned above was coated over both surfaces of the positive electrode core by a die coater. However, the slurry was not coated over one end portion of each surface of the positive electrode core to extend along a lengthwise direction thereof (the one end portions of both the surfaces being positioned in the same widthwise direction of the core) such that the core was exposed in each of those one end portions. Thus, the positive electrode core exposed portion 15 was formed. After drying the slurry and removing NMP as the dispersion medium, the positive electrode core was compressed by a roll press to have a predetermined thickness, and an obtained electrode plate was cut into a predetermined size.

Then, as illustrated in FIG. 3A, the insulating tapes 11b each made of polypropylene (PP) were bonded to the winding end-side edge portion of the positive electrode plate 11 at positions, which were located on both the surfaces of the positive electrode plate 11 and which were opposed to the separators 13, the insulating tapes 11b extending in the widthwise direction of the positive electrode mixture layer 11a in a predetermined width. At that time, the insulating tapes 11b were positioned to extend outwards (to the left in FIG. 3A) beyond the positive electrode mixture layers 11a, and respective extended portions of the insulating tapes 11b were bonded to each other. While a length of the insulating tape 11b is set equal to the width of the positive electrode mixture layer 11a of the positive electrode plate 11 in the illustrated example, it may be shorter or longer than the width of the positive electrode mixture layer 11a. The positive electrode plate 11 fabricated as described above is constituted as per illustrated in FIG. 3A.

[Fabrication of Negative Electrode Plate]

The negative electrode plate was fabricated as follows. Negative electrode mixture slurry was prepared by dispersing, in water, 98 parts by mass of graphite powder, 1 part by mass of carboxymethyl cellulose (CMC) as a viscosity improver, and 1 part by mass of styrene-butadiene rubber (SBR) as a binder. The prepared negative electrode mixture slurry was coated over both surfaces of the negative electrode core made of a copper foil having a thickness of 10 µm, and was then dried to form the negative electrode mixture layers on both the surfaces of the negative electrode core. After drying the slurry, the negative electrode core was compressed by a roll press to have a predetermined thickness, and an obtained electrode plate was cut into a predetermined size. The negative electrode mixture layers were then partly peeled off such that the negative electrode core exposed portions 16 in each of which the negative electrode mixture layer was not formed in a predetermined width over the entire electrode plate in a lengthwise direction thereof were formed on both surfaces of the electrode plate along one widthwise end of each of both the surfaces of the electrode plate. The negative electrode plate 12 fabricated as described above is constituted as per illustrated in FIG. 3B.

[Preparation of Nonaqueous Electrolytic Solution]

The nonaqueous electrolytic solution was prepared by mixing two kinds of solvents, i.e., ethylene carbonate (EC) and methyl ethyl carbonate (MEC), at a volume ratio of 3:7 (25° C. and 1 atm) to obtain a mixture solvent, adding 1 mol/L of $LiPF_6$ as electrolytic salt to the mixture solvent, and further adding vinylene carbonate VC at a proportion of 0.3% by mass with respect to the total mass of the nonaqueous electrolyte.

[Fabrication of Flat Wound Electrode Body]

The flat wound electrode body 14 was fabricated by winding the negative electrode plate 12 and the positive electrode plate 11, each fabricated as described above, in a state where both the plates were insulated from each other with the separator 13 interposed therebetween while the negative electrode plate 12 was positioned on the outermost surface side, and then by shaping the wound electrode plates into a flat roll shape. The winding end side of the flat wound electrode body 14 is constituted as per illustrated in FIG. 4A. Moreover, since the flat wound electrode body 14 is compressed, a positional relation among the positive electrode mixture layer 11a, the insulating tapes 11b, and the separators 13 in the positive electrode plate 11 after the fabrication of the flat wound electrode body 14 is as per illustrated in FIG. 4B.

By providing the insulating tapes 11b as described above, step-like level differences are formed at a winding end-side edge of the positive electrode plate 11. Therefore, even after the compression of the flat wound electrode body 14 when the flat wound electrode body 14 is fabricated, sufficient gaps are formed along a direction of a winding axis of the flat wound electrode body 14 (i.e., a direction perpendicular to the drawing sheet of FIG. 4B) between the positive electrode mixture layer 11a and each separator 13 and between each insulating tape 11b and each separator 13. Hence satisfactory gas permeability is ensured between the positive electrode mixture layer 11a and the outside of the flat wound electrode body 14. Accordingly, when lithium carbonate is decomposed in the positive electrode mixture layer 11a and carbon dioxide is generated upon the nonaqueous electrolyte secondary battery 10 coming into an overcharge state, the generated carbon dioxide is easily discharged to the outside of the flat wound electrode body 14.

Accordingly, in the nonaqueous electrolyte secondary battery 10 of the embodiment, the carbon dioxide is harder to stagnate on the surface of the positive electrode mixture layer 11a. Thus, the pressure inside the battery is allowed to rise quickly and the pressure-sensitive current interrupt mechanism 27 (see FIG. 2A) can be operated reliably before the temperature inside the battery rises to such an extent as causing an abnormal state, e.g., smoking, firing, or a burst. After the operation of the current interrupt mechanism 27, the charging current does not flow any more, and further generation of carbon dioxide is stopped. As a result, an excessive increase of the inner pressure in the nonaqueous electrolyte secondary battery 10 is prevented, and very high safety is ensured in the event of overcharge.

COMPARATIVE EXAMPLE

A concrete constitution of a nonaqueous electrolyte secondary battery of a comparative example will be described below with reference to FIGS. 5 and 6. The concrete constitution of the nonaqueous electrolyte secondary battery of the comparative example is substantially similar to that of the nonaqueous electrolyte secondary battery 10 of the embodiment except for the constitution of a positive electrode plate. Therefore, the following description is made by assigning the same reference symbols to the same components as those in the nonaqueous electrolyte secondary battery 10 of the embodiment and by referring to FIGS. 1 and 2 as required, while detailed description of those components is omitted.

Figure 5:
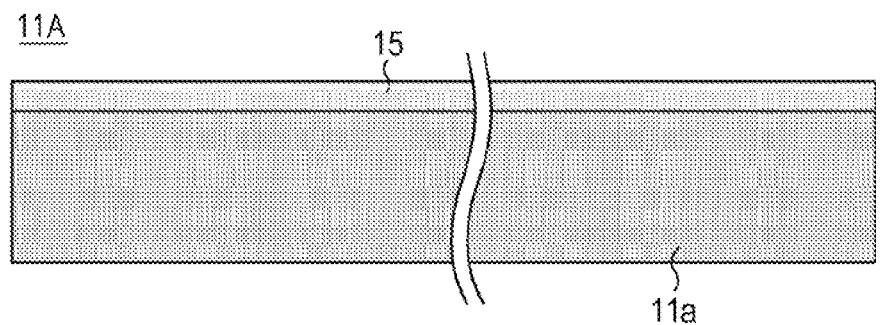
FIG. 5 is a plan view of a positive electrode plate representing a comparative example.
Figure 6A:
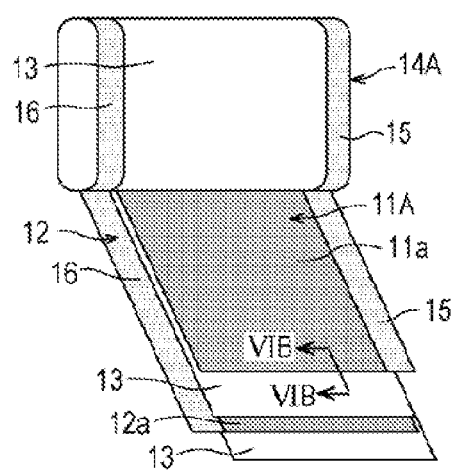
FIG. 6A is a perspective view of a flat-wound electrode body in the comparative example in a state where the winding end side thereof is developed.

In the nonaqueous electrolyte secondary battery of the comparative example, as illustrated in FIGS. 5 and 6, a positive electrode plate 11A has the same constitution as that of the positive electrode plate 11 in the embodiment except for that the insulating tapes 11b is not included in the positive electrode plate 11A. The winding end side of a flat wound electrode body 14A in the comparative example is constituted as per illustrated in FIG. 6A.

Figure 6B:
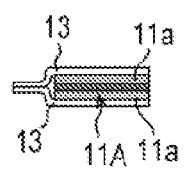
FIG. 6B is an enlarged sectional view taken along a line VIB-VIB in FIG. 6A after the completion of winding of the flat wound electrode body.

A positional relation between the positive electrode mixture layers 11a and the separators 13 in the positive electrode plate 11A after fabrication of the flat wound electrode body 14A is as per illustrated in FIG. 6B. Thus, when the insulating tapes are not present in a winding end-side edge portion of the positive electrode plate 11A, gaps formed between the positive electrode plate 11A and the separators 13 are very narrow because the separators 13 are soft.

In the nonaqueous electrolyte secondary battery of the comparative example, therefore, when lithium carbonate is decomposed in the positive electrode mixture layer 11a and carbon dioxide is generated upon the nonaqueous electrolyte secondary battery coming into an overcharge state, the generated carbon dioxide tends to stagnate on the surface side of the positive electrode mixture layer 11a. Hence the pressure-sensitive current interrupt mechanism cannot be operated reliably. Consequently, in the nonaqueous electrolyte secondary battery of the comparative example, safety is not so sufficient as compared with that in the nonaqueous electrolyte secondary battery 10 of the embodiment.

While the nonaqueous electrolyte secondary battery 10 of the embodiment employs the insulating tape 11b made of, e.g., PP, the insulating tape 11b may be made of a material optionally selected from among materials that are generally used for insulating tapes, such as polyethylene (PE), polyimide, polyamide, and polyester. As a thickness of the insulating tape 11b increases, a step-like level difference caused by the presence of the insulating tape 11b increases, and the size of the gap formed between the insulating tape 11b and the separator 13 also increases. Accordingly, gas permeability is improved. With an increase of the step-like level difference, however, unevenness in the surface of the flat wound electrode body 14 becomes more prominent. In view of the above point, the thickness of the insulating tape 11b is preferably not more than that of the positive electrode mixture layer 11a.

In the nonaqueous electrolyte secondary battery 10 of the embodiment, the insulating tape 11b is disposed, by way of example, only at the winding end-side edge portion of the positive electrode plate 11. However, the insulating tape 11b may be disposed only at the winding start-side edge portion, or at both the winding end-side edge portion and the winding start-side edge portion. In particular, when the insulating tape 11b is disposed at both the winding end-side edge portion and the winding start-side edge portion of the positive electrode plate 11, gas permeability in the direction of the winding axis of the flat wound electrode body 14 is further improved, and hence the above-described advantageous effect is obtained more satisfactorily.

While, in the nonaqueous electrolyte secondary battery 10 of the embodiment, the insulating tape 11b is bonded, by way of example, to each of both the surfaces of the positive electrode mixture layer 11a, it may be bonded to only one surface of the positive electrode mixture layer 11a. Furthermore, the nonaqueous electrolyte secondary battery 10 of the embodiment represents, by way of example, the case where the insulating tapes 11b bonded to both the surfaces of the positive electrode mixture layer 11a are arranged to extend outwards from the positive electrode mixture layer 11a and are bonded to each other. However, the insulating tapes 11b may be bonded to be located just on the surfaces of the positive electrode mixture layer 11a.

The positive electrode active material usable in the nonaqueous electrolyte secondary battery of the present invention can be optionally selected from various compounds insofar as the compounds are able to reversibly occlude and release lithium ions. Lithium transition metal compound oxides expressed by $LiMO_2$ (M is at least one of Co, Ni and Mn) and being able to reversibly occlude and release lithium ions, i.e., $LiCoO_2$, $LiNiO_2$, $LiNi_yCo_{1-y}O_2$ (y=0.01 to 0.99), $LiMnO_2$, $LiCo_xMn_yNi_zO_2$ (x+y+z=1), $LiM_2O_4$, and $LiFePO_4$, can be used as the positive electrode active material singularly or in a mixed state of two or more among them. In addition, a material obtained by adding a hetero metal element, e.g., zirconium, magnesium or aluminum, to a lithium cobalt compound oxide is also usable.

A solvent for the nonaqueous electrolyte is not limited to particular one, and it may be one of solvents that have been used so far in nonaqueous electrolyte secondary batteries. Examples of the solvents usable here include cyclic carbonates such as ethylene carbonate (EC), propylene carbonate (PC), butylene carbonate, and vinylene carbonate (VC); chain carbonates such as dimethyl carbonate (DMC), methyl ethyl carbonate (MEC), and diethyl carbonate (DEC); compounds each containing ester, such as methyl acetate, ethyl acetate, propyl acetate, methyl propionate, ethyl propionate, and γ-butyl lactone; compounds each containing a sulfone group, such as propane sulfone; compounds each containing ether, such as 1,2-dimethoxyethane, 1,2-diethoxyethane, tetrahydrofuran, 1,2-dioxane, 1,4-dioxane, and 2-methyltetrahydrofuran; compounds each containing nitrile, such as butyronitrile, valeronitrile, n-heptanenitrile, succinonitrile, glutarnitrile, adiponitrile, pimelonitrile, 1,2,3-propanetricarbonitrile, and 1,3,5-pentanetricarbonitrile; and compounds each containing amide, such as dimethylformamide. In particular, solvents obtained by partly replacing H, which is contained in the above-mentioned solvents, with F are preferably used. The above-mentioned solvents can be used singularly or in combinations of the plural solvents. In particular, a solvent obtained by combining the cyclic carbonate and the chain carbonate with each other, or a solvent obtained by combining a compound containing a small amount of nitrile or a compound containing ether with the above combined solvent is preferable.

An ionic liquid can also be used as the nonaqueous solvent for the nonaqueous electrolyte. In such a case, the cationic species and the anionic species are not limited to particular ones. However, a combination using a pyridinium cation, an imidazolium cation, or a quarternary ammonium cation as the cationic species, and a fluorine-containing imide anion as the anionic species is particularly preferable from the viewpoint of low viscosity, electrochemical stability, and hydrophobic property.

A solute used in the nonaqueous electrolyte may be one or more of known lithium salts that have been generally used so far in nonaqueous electrolyte secondary batteries. Those lithium salts may be lithium salts containing one or more elements selected from among P, B, F, O, S, N and Cl. More specifically, lithium salts, such as $LiPF_6$, $LiBF_4$, $LiCF_3SO_3$, $LiN (FSO_2)_2$, $LiN (CF_3SO_2)_2$, $LiN (C_2F_5SO_2)_2$, $LiN (CF_3SO_2) (C_4F_9SO_2)$, $LiC (C_2F_5SO_2)_3$, $LiAsF_6$, $LiClO_4$, and $LiPF_2O_2$, and mixtures of the above lithium salts can be used optionally. In particular, $LiPF_6$ is preferably used from the viewpoint of improving high-rate charge and discharge characteristics and durability of the nonaqueous electrolyte secondary battery.

Lithium salts each containing an oxalato as an anion can also be used as the solute. The lithium salts each containing an oxalato as an anion may be LiBOB (lithium-bis(oxalato) borate) and lithium salts each containing an anion in which $C_2O_4^{2-}$ is coordinated as a central atom, e.g., lithium salts expressed by $Li [M(C_2O_4)_xR_y]$ (where M denotes an element selected from among transition metals and elements of 13, 14 and 15 groups in the periodic table, R denotes a group selected from among halogen, an alkyl group, and a halogen-substituted alkyl group, x denotes a positive integer, and y is 0 or a positive integer). Specific examples of those lithium salts are $Li [B(C_2O_4)F_2]$, $Li [P(C_2O_4)F_4]$, and $Li [P(C_2O_4)_2F_2]$. However, LiBOB is most preferably used in order to form a stable coating on the surface of the negative electrode even under a high-temperature environment.

The above-mentioned solutes may be used singularly or in a mixed state of two or more among them. Although a concentration of the solute is not limited to a particular value, the concentration is desirably in the range of 0.8-1.7 mol per liter of the nonaqueous electrolytic solution. In applications requiring discharge at a large current, the concentration of the solute is desirably in the range of 1.0-1.6 mol per liter of the nonaqueous electrolytic solution.

In the nonaqueous electrolyte secondary battery according to one aspect of the present invention, a negative electrode active material used in the negative electrode of the nonaqueous electrolyte secondary battery is not limited to particular one insofar as the material is able to reversibly occlude and release lithium ions. For example, a carbon material, a lithium metal, a metal or alloy material forming an alloy with lithium, and a metal oxide can be used optionally. From the viewpoint of the material cost, the carbon material is preferably used as the negative electrode active material. For example, natural graphite, artificial graphite, mesophase pitch-based carbon fibers (MCF), mesocarbon microbeads (MCMB), coke, and hard carbon are usable. In particular, a carbon material obtained by coating a graphite material with low crystallinity carbon is preferably used from the viewpoint of improving high-rate charge and discharge characteristics.

The separator can be made of a material that has been generally known and used so far in nonaqueous electrolyte secondary batteries. In practice, the separator may be made of polyethylene. An alternative material may be obtained by forming a layer of polypropylene on the surface of the separator made of polyethylene, or by coating an aramid-based resin over the surface of the separator made of polyethylene.

A layer containing inorganic filler, which has been used so far in the relevant art, may be formed at the interface between the positive electrode and the separator and the interface between the negative electrode and the separator. The filler may be one of oxides and phosphate compounds, which have been used so far in the relevant art, containing titanium, aluminum, silicon, and magnesium singularly or in combinations of two or more among those elements, or one of materials obtained by treating the surfaces of those oxides and phosphate compounds with, e.g., a hydroxide. The filler layer can be formed, for example, by a method of coating slurry, which contains the filler, directly over the positive electrode, the negative electrode, or the separator, or a method of bonding a sheet made of the filler to the positive electrode, the negative electrode, or the separator.

The above embodiment has been described in connection with the nonaqueous electrolyte secondary battery in which the pressure-sensitive current interrupt mechanism is disposed at least one of a conduction path between the positive electrode plate and the positive electrode terminal and a conduction path between the negative electrode plate and the negative electrode terminal. It is also conceivable to constitute a nonaqueous electrolyte secondary battery including a pressure-sensitive forced short-circuiting mechanism instead of the pressure-sensitive current interrupt mechanism.

Figure 7:
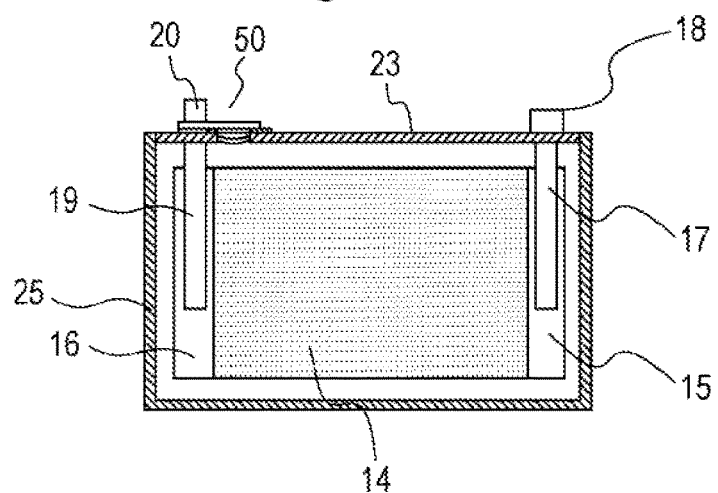
FIG. 7 is a sectional view of the nonaqueous electrolyte secondary battery including a forced short-circuiting mechanism.
Figure 8A:
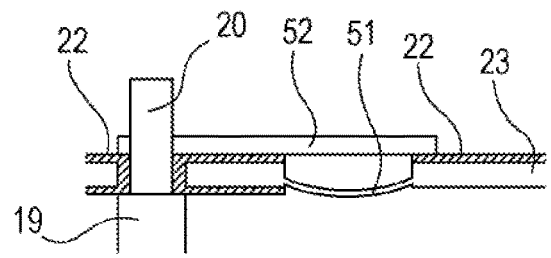
FIG. 8A illustrates a state before the operation of the forced short-circuiting mechanism.

As illustrated in FIG. 7, the forced short-circuiting mechanism is preferably disposed in the sealing member 23 near the negative electrode terminal 20. FIG. 8 is an enlarged view of a portion in which the forced short-circuiting mechanism 50 illustrated in FIG. 7 is disposed. FIG. 8A illustrates a state before the operation of the forced short-circuiting mechanism 50, and FIG. 8B illustrates a state after the operation of the forced short-circuiting mechanism 50.

As illustrated in FIG. 8A, the sealing member 23 made of a metal includes a valve portion 51 electrically connected to the positive electrode plate 11, and a plate-shaped conductive member 52 arranged on the outer side of the valve portion 51 and electrically connected to the negative electrode plate 12. The valve portion 51 is made of a metal, and it may be formed integrally with the sealing member 23. As an alternative, the valve portion 51 may be provided separately from the sealing member 23 and may be connected to the sealing member 23. In the illustrated example, the conductive member 52 is connected to the negative electrode terminal 20 and is further electrically connected to the negative electrode plate 12 through the negative electrode current collector 19. The conductive member 52, the negative electrode terminal 20, and the negative electrode current collector 19 are electrically insulated from the sealing member 23 by the insulating member 22.

Figure 8B:
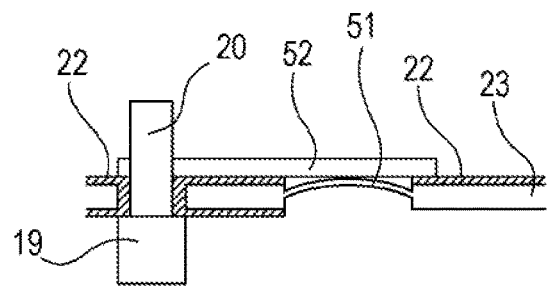
FIG. 8B illustrates a state after the operation of the forced short-circuiting mechanism.

When the battery comes into the overcharge state and the pressure inside the battery rises above a predetermined value, as illustrated in FIG. 8B, the valve portion 51 is deformed outwards (upwards in FIG. 8B) and is contacted with the conductive member 52. Since the metal-made valve portion 51 is electrically connected to the positive electrode plate 11 and the conductive member 52 is electrically connected the negative electrode plate 12, the positive electrode plate 11 and the negative electrode plate 12 are brought into a short-circuited state upon the contact between the valve portion 51 and the conductive member 52. As a result, the charging current can be prevented from flowing into the electrode body. Moreover, energy within the electrode body can be released quickly. Thus, safety can be ensured when the battery comes into the overcharge state.

REFERENCE SIGNS LIST

10 . . . nonaqueous electrolyte secondary battery 11, 11A . . . positive electrode plate 11a . . . positive electrode mixture layer 11b . . . insulating tape 12 . . . negative electrode plate 12a . . . negative electrode mixture layer 13 . . . separator 14 . . . flat wound electrode body 15 . . . positive electrode core exposed portion 15a . . . welding mark 16 . . . negative electrode core exposed portion 17 . . . positive electrode current collector 18 . . . positive electrode terminal 19 . . . negative electrode current collector 20 . . . negative electrode terminal 21, 22 . . . insulating members, 23 . . . sealing member 24 . . . insulating sheet 25 . . . rectangular outer casing 26 . . . electrolytic solution filling port 27 . . . current interrupt mechanism 28 . . . gas discharge valve 29 . . . positive electrode conductive member, 30 . . . positive electrode intermediate member, 31 . . . negative electrode conductive member, 32 . . . negative electrode intermediate member, 33, 34 . . . welding marks 50 . . . forced short-circuiting mechanism 51 . . . valve portion 52 . . . conductive member

The invention claimed is:

1. A nonaqueous electrolyte secondary battery comprising:
   a positive electrode plate including a positive electrode mixture layer formed on a positive electrode core;
   a negative electrode plate including a negative electrode mixture layer formed on a negative electrode core;
   a flat wound electrode body in which the positive electrode plate and the negative electrode plate are wound into a flat roll shape in a state insulated from each other with a separator interposed between the positive electrode plate and the negative electrode plate;
   a nonaqueous electrolyte; and
   an outer casing,
   wherein a positive electrode core exposed portion is formed in a form of wound multilayers in one end portion of the flat wound electrode body,
   a negative electrode core exposed portion is formed in a form of wound multilayers in the other end portion of the flat wound electrode body,
   the wound multilayers of the positive electrode core exposed portion are bundled and connected to a positive electrode current collector,
   the wound multilayers of the negative electrode core exposed portion are bundled and connected to a negative electrode current collector,
   the nonaqueous electrolyte secondary battery includes a pressure-sensitive current interrupt mechanism electrically connected to at least one of the positive electrode current collector and the negative electrode current collector,
   the positive electrode mixture layer contains lithium carbonate,
   an insulating tape is bonded onto the positive electrode mixture layer in at least one of a winding start-side edge portion and a winding end-side edge portion of the positive electrode plate at a position opposing to the separator, the insulating tape extending in a widthwise direction of the positive electrode mixture layer, and
   a length of the insulating tape extends in a direction of a winding axis around which the flat wound electrode body is wound.

2. The nonaqueous electrolyte secondary battery according to claim 1, wherein the positive electrode mixture layer is formed in each of both surfaces of the positive electrode core, and the insulating tape is bonded to each of respective surfaces of the positive electrode mixture layer.

3. The nonaqueous electrolyte secondary battery according to claim 2, wherein the insulating tape bonded to one surface of the positive electrode core and the insulating tape bonded to an opposite surface of the positive electrode core are positioned to extend outwards beyond the positive electrode mixture layers and are bonded to each other.

4. The nonaqueous electrolyte secondary battery according to claim 1, wherein a concentration of lithium carbonate in the positive electrode mixture layer is not less than 0.1% by mass and not more than 5% by mass with respect to mass of a positive electrode mixture.

5. The nonaqueous electrolyte secondary battery according to claim 1, wherein the outer casing has a rectangular shape.

6. The nonaqueous electrolyte secondary battery according to claim 1, wherein a length of the insulating tape measured in the direction of the winding axis is greater than a width of the insulating tape measured perpendicular to the winding axis and to a thickness of the positive electrode plate.

7. The nonaqueous electrolyte secondary battery according to claim 1, wherein the insulating tape includes a first insulating tape and a second insulating tape,
the first insulating tape is bonded to a first surface of the positive electrode plate,
the second insulating tape is bonded to a second surface opposite the first surface of the positive electrode plate,
each of the first insulating tape and the second insulating tape extends outward beyond the at least one of the winding start-side edge portion and the winding end-side edge portion in a winding direction of the flat wound electrode body, and
the first insulating tape and the second insulating tape are bonded together.

8. The nonaqueous electrolyte secondary battery according to claim 1, wherein a first airflow path is between the insulating tape and the positive electrode plate, the first airflow path extending in an axis direction in which the winding axis extends, and
a second airflow path is between the separator and the insulating tape, the second airflow path extending in the axis direction.

9. The nonaqueous electrolyte secondary battery according to claim 1, wherein an edge of the positive electrode mixture layer and an edge of the positive electrode core which are adjacent to the at least one of the winding start-side edge portion and the winding end-side edge portion are flush with each other.

10. The nonaqueous electrolyte secondary battery according to claim 1, wherein an area in which the insulating tape directly contacts the positive electrode mixture layer is greater than an area in which the insulating tape directly contacts the positive electrode core.

11. The nonaqueous electrolyte secondary battery according to claim 1, wherein the positive electrode plate includes a pair of opposed longitudinal edges and a pair of opposed lateral edges,
the insulating tape is bonded over and along at least one of the pair of opposed lateral edges, and
the positive electrode core exposed portion is disposed along one of the pair of opposed longitudinal edges.

12. The nonaqueous electrolyte secondary battery according to claim 1, wherein the insulating tape is longer than the positive electrode mixture layer in an axis direction in which the winding axis extends.

13. A nonaqueous electrolyte secondary battery comprising:
a positive electrode plate including a positive electrode mixture layer formed on a positive electrode core;
a negative electrode plate including a negative electrode mixture layer formed on a negative electrode core;
a flat wound electrode body in which the positive electrode plate and the negative electrode plate are wound into a flat roll shape in a state insulated from each other with a separator interposed between the positive electrode plate and the negative electrode plate;
a nonaqueous electrolyte; and
an outer casing,
wherein a positive electrode core exposed portion is formed in a form of wound multilayers in one end portion of the flat wound electrode body,
a negative electrode core exposed portion is formed in a form of wound multilayers in the other end portion of the flat wound electrode body,
the wound multilayers of the positive electrode core exposed portion are bundled and connected to a positive electrode current collector,
the wound multilayers of the negative electrode core exposed portion are bundled and connected to a negative electrode current collector,
the nonaqueous electrolyte secondary battery includes a pressure-sensitive current interrupt mechanism electrically connected to at least one of the positive electrode current collector and the negative electrode current collector,
the positive electrode mixture layer contains lithium carbonate,
an insulating tape is bonded onto the positive electrode mixture layer in at least one of a winding start-side edge portion and a winding end-side edge portion of the positive electrode plate at a position opposing to the separator, the insulating tape extending in a widthwise direction of the positive electrode mixture layer,
the insulating tape includes a first insulating tape and a second insulating tape,
the first insulating tape is bonded to a first surface of the positive electrode plate,
the second insulating tape is bonded to a second surface opposite the first surface of the positive electrode plate,
each of the first insulating tape and the second insulating tape extends outward beyond the at least one of the winding start-side edge portion and the winding end-side edge portion in a winding direction of the flat wound electrode body, and
the first insulating tape and the second insulating tape are bonded together.

14. The nonaqueous electrolyte secondary battery according to claim 13, wherein a first airflow path is between the insulating tape and the positive electrode plate, the first airflow path extending in an axis direction in which the winding axis extends, and
a second airflow path is between the separator and the insulating tape, the second airflow path extending in the axis direction.

15. The nonaqueous electrolyte secondary battery according to claim 13, wherein an area in which the insulating tape directly contacts the positive electrode mixture layer is greater than an area in which the insulating tape directly contacts the positive electrode core,
the insulating tape is longer than the positive electrode mixture layer in an axis direction in which a winding axis of the flat wound electrode body extends, and
a length of the insulating tape extends in a direction of the winding axis of the flat wound electrode body.

16. A nonaqueous electrolyte secondary battery comprising:
a positive electrode plate including a positive electrode mixture layer formed on a positive electrode core;
a negative electrode plate including a negative electrode mixture layer formed on a negative electrode core;
a flat wound electrode body in which the positive electrode plate and the negative electrode plate are wound into a flat roll shape in a state insulated from each other with a separator interposed between the positive electrode plate and the negative electrode plate;

a nonaqueous electrolyte; and
an outer casing,
wherein a positive electrode core exposed portion is formed in a form of wound multilayers in one end portion of the flat wound electrode body,
a negative electrode core exposed portion is formed in a form of wound multilayers in the other end portion of the flat wound electrode body,
the wound multilayers of the positive electrode core exposed portion are bundled and connected to a positive electrode current collector,
the wound multilayers of the negative electrode core exposed portion are bundled and connected to a negative electrode current collector,
the nonaqueous electrolyte secondary battery includes a pressure-sensitive forced short-circuiting mechanism,
the positive electrode mixture layer contains lithium carbonate,
an insulating tape is bonded onto the positive electrode mixture layer in at least one of a winding start-side edge portion and a winding end-side edge portion of the positive electrode plate at a position opposing to the separator, the insulating tape extending in a widthwise direction of the positive electrode mixture layer, and
a length of the insulating tape extends in a direction of a winding axis around which the flat wound electrode body is wound.

17. The nonaqueous electrolyte secondary battery according to claim 16, wherein a length of the insulating tape measured in the direction of the winding axis is greater than a width of the insulating tape measured perpendicular to the winding axis and to a thickness of the positive electrode plate.

18. The nonaqueous electrolyte secondary battery according to claim 16, wherein the insulating tape includes a first insulating tape and a second insulating tape,
the first insulating tape is bonded to a first surface of the positive electrode plate,
the second insulating tape is bonded to a second surface opposite the first surface of the positive electrode plate,
the first insulating tape and the second insulating tape are bonded together.

19. The nonaqueous electrolyte secondary battery according to claim 16, wherein a first airflow path is between the insulating tape and the positive electrode plate, the first airflow path extending in an axis direction in which the winding axis extends, and
a second airflow path is between the separator and the insulating tape, the second airflow path extending in the axis direction.

20. The nonaqueous electrolyte secondary battery according to claim 16, wherein an area in which the insulating tape directly contacts the positive electrode mixture layer is greater than an area in which the insulating tape directly contacts the positive electrode core, and
the insulating tape is longer than the positive electrode mixture layer in an axis direction in which the winding axis extends.

* * * * *